United States Patent
Patodia et al.

(10) Patent No.: US 11,983,721 B2
(45) Date of Patent: May 14, 2024

(54) COMPUTER SOFTWARE ARCHITECTURE FOR EXECUTION EFFICIENCY

(71) Applicant: PayPal, Inc., San Jose, CA (US)

(72) Inventors: Prabin Patodia, Bangalore (IN); Sumit Kumar, Bangalore (IN)

(73) Assignee: PayPal, Inc., San Jose, CA (US)

( * ) Notice: Subject to any disclaimer, the term of this patent is extended or adjusted under 35 U.S.C. 154(b) by 273 days.

(21) Appl. No.: 17/514,347

(22) Filed: Oct. 29, 2021

(65) Prior Publication Data
US 2023/0135329 A1    May 4, 2023

(51) Int. Cl.
| | |
|---|---|
| G06F 15/16 | (2006.01) |
| G06N 20/00 | (2019.01) |
| G06Q 20/40 | (2012.01) |
| H04L 41/5003 | (2022.01) |
| H04L 67/1014 | (2022.01) |

(52) U.S. Cl.
CPC ......... *G06Q 20/4016* (2013.01); *G06N 20/00* (2019.01); *G06Q 20/407* (2013.01); *H04L 41/5003* (2013.01); *H04L 67/1014* (2013.01)

(58) Field of Classification Search
CPC ............ H04L 41/5003; H04L 67/1014; G06Q 20/407; G06Q 20/4016; G06N 20/00
USPC .......................................................... 709/224
See application file for complete search history.

(56) References Cited

U.S. PATENT DOCUMENTS

| | | | |
|---|---|---|---|
| 8,200,812 B2 * | 6/2012 | Anderson | H04L 47/12 709/224 |
| 9,356,846 B2 * | 5/2016 | Cremonesi | G06N 5/022 |
| 10,063,634 B2 * | 8/2018 | Iyengar | H04L 47/83 |
| 10,579,748 B2 * | 3/2020 | Zink | G06F 11/3442 |
| 10,587,681 B2 * | 3/2020 | Iyengar | H04L 41/142 |
| 10,834,230 B2 * | 11/2020 | Brooks | G06F 9/466 |
| 10,917,463 B2 * | 2/2021 | Iyengar | H04L 67/1012 |
| 10,924,347 B1 * | 2/2021 | Narsian | H04L 47/12 |
| 11,573,964 B2 * | 2/2023 | Ehrlich | G06N 20/00 |
| 11,847,130 B2 * | 12/2023 | Kaspa | G06F 16/26 |
| 2008/0279521 A1 * | 11/2008 | Kowalczyk | G02B 6/4452 385/135 |
| 2014/0173618 A1 * | 6/2014 | Neuman | G06F 9/5066 718/104 |
| 2017/0149875 A1 * | 5/2017 | Iyengar | H04L 41/5051 |
| 2018/0060122 A1 * | 3/2018 | Tang | G06F 9/4887 |
| 2018/0316750 A1 * | 11/2018 | Iyengar | H04L 67/10 |
| 2020/0027064 A1 * | 1/2020 | Mishra | G06F 16/9537 |
| 2020/0177673 A1 * | 6/2020 | Iyengar | H04L 67/1097 |
| 2020/0342462 A1 * | 10/2020 | Todd | G06N 5/04 |
| 2021/0019321 A1 * | 1/2021 | Ehrlich | G06N 20/00 |
| 2022/0374442 A1 * | 11/2022 | Kaspa | G06F 16/2282 |
| 2023/0185807 A1 * | 6/2023 | Ehrlich | G06F 16/904 707/769 |

* cited by examiner

Primary Examiner — Moustafa M Meky
(74) Attorney, Agent, or Firm — Haynes and Boone, LLP

(57) ABSTRACT

The present disclosure pertains to an improved computing architecture allowing for better utilization of CPU, memory, network bandwidth, and other computing resources, particularly within the context of a decision service system that handles client requests. These methods and systems may be directed to the evaluation and use of a partial response from a decision service system when the generation of a full response by the decision service system is predicted to take longer than what is expected.

20 Claims, 7 Drawing Sheets

COMPUTER SOFTWARE ARCHITECTURE FOR EXECUTION EFFICIENCY

FIELD OF THE INVENTION

The present specification generally relates to improving computer efficiency and utilization of decision service systems, and more specifically, to the evaluation and use of a partial response from a decision service system when the generation of a full response by the decision service system is predicted to take longer than expected, according to various embodiments.

BACKGROUND

A client device, when receiving a communication from a server that may require the execution of pre-defined tasks by a decision service system, may send a request to the decision service system that triggers those pre-defined tasks, and a response is provided to the client device. Sometimes, the request to the server may time out, and the client device may not receive the response from the decision service system because the execution of the pre-defined tasks takes longer than what is expected. In such cases, the client device may repeatedly resend the request, burdening the decision service system and resulting in the inefficient utilization of its computing resources. As such, Applicant recognizes a need to improve the handling of requests that may time out to better utilize server computing resources.

DETAILED DESCRIPTION

Figure 1:
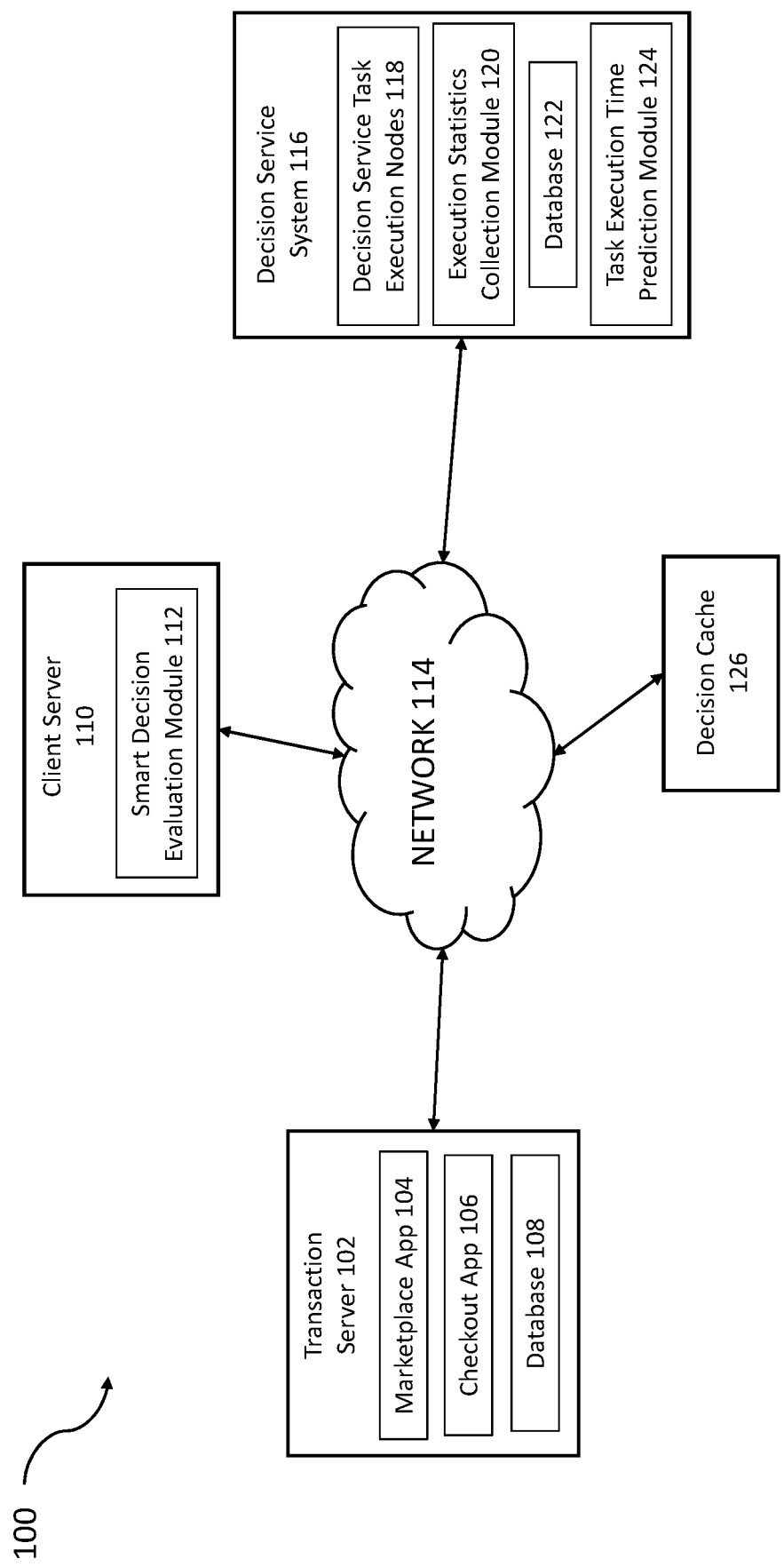
FIG. 1 is a block diagram of a networked system, according to various embodiments of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to methods and systems for the efficient utilization of computing resources of decision service systems, and in particular, for the evaluation and use of a partial response from a decision service system when the generation of a full response by the decision service system is predicted to take longer than what is expected (e.g., prescribed by a service level agreement (SLA) between the decision service system and the client, which may be a server, that is requesting for the response). Decision service systems are entities or services that provide decisions to requesting clients where the decisions, i.e., responses to the requests, are to be generated after execution of pre-defined tasks such as data gathering, data validation, computations, building or generating responses or decisions, and/or the like. For instance, an upstream client of the client server such as a merchant that is transacting with a customer may wish to determine financial or otherwise risks associated with the transaction, and may contact the client server for an evaluation of said transaction risks. In such cases, the client server may then in turn send a request to the decision service system to have the transaction risks evaluated and a response or decision provided to the client server. For example, the merchant may use its merchant or transaction server to communicate with the client server to have the decision service system perform the transaction risk evaluations. In such cases, the client server may send a request to the decision service system to have the evaluation performed according to an SLA between the client server and the decision service system.

In some instances, the decision service system may execute pre-defined tasks so as to generate the decisions in response to the request from the client server. For example, after receiving the request to evaluate the transaction risks associated with the customer of the merchant, the decision service system may perform pre-defined tasks such as the afore-mentioned data gathering (e.g., on the transaction habits and history of the customer), data validation, computations (e.g., to compute the level of risk that the customer may pose to the merchant based on the customer's transaction history), response or decision building, etc., to generate the decision or response to the request from the client server. In some cases, the decision service system may include multiple nodes, and each node may be responsible for performing one or more of the pre-defined tasks. That is, for example, a first node may be tasked with executing the pre-defined task of data gathering, a second node may be tasked with executing the pre-defined task of data validation, etc. In some instances, however, instead of or in addition to each node being tasked to execute the pre-defined tasks, the nodes may be tasked with executing any task, or portion thereof, that may have to be executed to generate the response to the client's request.

SLAs between a client server and a decision service system specify the amount of time a decision service system may take to provide the latter with the response or decision after the request is submitted by the client server. When the client service system is unable to respond to the client server within the specified time (referred hereinafter as the "SLA time limit"), for example, because one or more of the nodes have not completed executing their assigned tasks, the client server may resend the request, placing extra load on an already burdened decision service system and resulting in inefficient utilization of the system's as well as the client server's resources. The client server may also continue to resend the request until it receives the decision or response or until it reaches a pre-determined limit for resending requests, which may render the client service system unstable or less resilient when the repeated requests also fail. As such, there is a need for methods and systems that reduce or eliminate the need for a client server to resend requests for decisions or responses from a decision service system when the decision service system fails to do so within the SLA time limit specified in the SLA therebetween.

Some embodiments of the present disclosure disclose methods and systems that allow a decision service system to respond to a client server with a partial response to or decision regarding a request from the client server when the decision service system predicts that the generation of the full response may take more time than the SLA time limit. In some instances, the decision service system may generate and provide the partial response to the client server, along with information that allows the client server to retrieve the full response or decision when it is ready and available. For example, the information may include but is not limited to a unique identification of the full response, a callback location at which the full response may be found (e.g., a callback uniform resource locator (URL) of a response or decision cache), a call back time stamp identifying the time when the full response may be available, the validity of the full response (i.e., the duration before the full response expires after it becomes available at the callback URL), and/or the like.

In such cases, the client server may evaluate the partial response received from the decision service system to determine whether the partial response is at least an adequate response to the request that the client server submitted to the decision service system. That is, the client server may evaluate the quality of the partial response to determine whether the partial response is an adequate response for the client server's upstream client needs. For instance, the client server may evaluate the partial response to determine whether the partial response includes critical parameters that may be needed to properly respond to the upstream client's inquiry or request. For example, with reference to the above example, the client server may evaluate the partial response received from the decision service system to determine whether the partial response adequately addresses the merchant's (i.e., the client server's upstream client) inquiry about the transactional risks posed by the customer of the merchant. If so, the client server may pass the partial response to a computing device of the upstream client (e.g., the transaction server of the merchant). If the partial response is deemed to be inadequate, the client server may wait until the time specified by the callback time to access the full response at the callback location (e.g., before the full response expires after its validity time).

FIG. 1 is a block diagram of a networked system 100 according to various embodiments of the present disclosure. Networked system 100, which may be a managed compute facilities network, may comprise or implement a plurality of servers, workstations and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

In some embodiments, the networked system 100 may include a transaction server 102, a client server 110, a decision service system 116, and a decision cache 126 that are in communication with each other over a network 114. In some instances, the transaction server 102, the client server 110, the decision service system 116, and the decision cache 126 may each include or be associated with one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of networked system 100, and/or accessible over network 114. In some instances, there can be one or more transaction servers 102, client servers 110, decision service systems 116, and decision caches 126 (i.e., the number of each can be different from those shown in FIG. 1).

In some embodiments, the transaction server 102 may be maintained, for example, by a merchant or seller offering various products and/or services. The merchant may have a physical point-of-sale (POS) store front. Transaction server 102 may be used for POS or online purchases and transactions. Generally, transaction server 102 may be maintained by anyone or any entity that receives money, which includes charities as well as retailers and restaurants. For example, a purchase transaction may be payment or gift to an individual. Transaction server 102 may include a database 108 identifying available products and/or services (e.g., collectively referred to as items) which may be made available for viewing and purchase by a customer. Accordingly, transaction server 102 also may include a marketplace application 104 which may be configured to serve information over network 114 to a computing device of the customer of the merchant. In some instances, the customer may interact with the marketplace application 150 via browser applications of his/her computing device over network 114 in order to view various products, food items, or services identified in database 108.

In some embodiments, transaction server 102 also may include a checkout application 106 which may be configured to facilitate the purchase by the customer of the merchant of goods or services online or at a physical POS or store front. Checkout application 106 may be configured to accept payment information from or on behalf of the customer through some payment provider server over network 114. Checkout application 106 may be configured to receive payment via a plurality of payment methods including cash, credit cards, debit cards, checks, money orders, or the like.

In some embodiments, the network 140 may be implemented as a single network or a combination of multiple networks. For example, in various embodiments, network 140 may include the Internet or one or more intranets, landline networks, wireless networks, and/or other appropriate types of networks. In another example, the network 140 may comprise a wireless telecommunications network (e.g., cellular phone network) adapted to communicate with other communication networks, such as the Internet.

In some embodiments, the client server 110 may be maintained by a client of the decision service system 116 that may have its own upstream clients such as but not limited to the merchant maintaining the transaction server 102. In some instances, the client server 110 may be configured to receive inquiries or requests from the transaction server 102 the response to which may have to be generated by the decision service system 116. For example, as discussed above, the merchant may be conducting a transaction with a customer and may wish to determine risks associated with the transaction. In such cases, the transaction server 102 may communicate with the client server 110 over the network 114 to have the transaction risks evaluated. In some instances, the client server 110 may then in return transmit a request to the decision service system 116 over the network 114 to have the transaction risks evaluated by the decision service system 116.

In some embodiments, the client server 110 may include a smart decision evaluation module 112 that is configured to evaluate a response or decision received from the decision service system 116 in response to the request sent to the decision service system 116 by the client server 110. In some instances, the response may be a partial response to the request and the smart decision evaluation module 112 may be configured to evaluate the quality of the partial response. For example, the smart decision evaluation module 112 may evaluate the partial response to determine whether the partial response may be considered as an at least adequate response to the request from the client server 110 and/or the inquiry from the transaction server 102 to the client server 110. For example, the client server 110 may evaluate the partial response to determine if the partial response includes all the critical parameters that a response (including a partial response) should have for it to be considered as an adequate response to the inquiry/request. For instance, with reference to the above example, if an indication of the availability of enough funds in the payment account of the customer is deemed to be a critical parameter, the client server 110 may evaluate the quality of the partial response from the decision service system 116 by determining whether the partial response from the decision service system in fact includes said indication (e.g., if the indication is not included, the partial response may be considered to be inadequate).

As used in the present disclosure, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In some embodiments, the decision service system 116 may be maintained by a provider of a decision service that has an SLA with a client associated with the client server 110 to provide a full response to or decision regarding a request from the client server 110 within an SLA time limit specified in the SLA. In some instances, the decision service system may be configured to receive a request from the client server 110, the response to which may be generated after execution of one or more pre-defined tasks. In some instances, the decision service system 116 may include one or more decision service task execution (DSTE) nodes 118 that are tasked or assigned to execute the pre-defined tasks needed for generating a response (e.g., partial or full response) to the request from the client server 110. For example, the pre-defined tasks may include the gathering of data that would allow the decision service system 116 to generate the full or partial response to the request, the validation of the gathered data, computations based on the gathered/validated data to generate the full or partial response, the building of the response or decision based on the computations, and/or the like. In such cases, the DSTE nodes 118 may be tasked with or assigned to execute the various pre-defined tasks. It is to be noted that the above is a non-limiting example and the DSTE nodes 118 may be tasked with or assigned to execute any tasks that may be needed to generate the partial or full response.

In some embodiments, one or more of the DSTE nodes 118 may be main executor nodes tasked with assigning the various tasks among the DSTE nodes 118. For example, in some instances, when the decision service system 116 receives a request from the client server 110, the main executor node or nodes of the DSTE nodes 118 may determine what types of pre-defined tasks that may have to be executed to generate a full or partial response to the request, and assign these determined tasks to the various nodes of the DSTE nodes 118. In some instances, the various pre-defined tasks may be configured to be executed in series or in parallel. That is, in some cases, any two tasks may be executable by a pair of nodes of the DSTE nodes 118 in parallel, while in other cases, any two tasks may be executable in series, either by the same node or different nodes, in which case one node may await the result of the execution of the first task of the pair of tasks by another node before commencing the execution of the second task of the pair of tasks.

In some embodiments, the decision service system 116 may include an execution statistics collection (ESC) module 120 that is configured to monitor each of the DSTE nodes 118 while executing a pre-defined task and collect various statistics about the execution of the task. In some instances, the statistics collected about a DSTE node 118 and/or the execution of a pre-defined task by the DSTE node 118 may be related to the amount of time that it takes the DSTE node 118 to complete the pre-defined task, such as but not limited to the average, percentiles (e.g., about 90%, about 95%, about 99%, and/or the like), median, standard deviation, etc., of the times or durations for the DSTE node 118 to execute the assigned pre-defined task. For example, one of the DSTE nodes 118 may be assigned to gather data needed for generating responses or decisions to requests from the client server 110, and the ESC module 120 may be configured to monitor said DSTE node 118 while executing the assigned pre-defined tasks. In such example, the ESC module 120 may monitor the executions by the assigned DSTE node 118 and compute any of the afore-mentioned statistical metrics associated with the time or duration of execution.

In some embodiments, as noted above, the ESC module 120 may monitor the execution of the pre-defined tasks by each of the DSTE nodes 118 and record task execution statistics (e.g., such as afore-mentioned execution time related metrics) in the database 122 of the decision service system 116. In some instances, the monitoring of the DSTE nodes 118 and associated recordation of the execution statistics may occur on a periodic basis, for example, every minute, every hour, every day, and/or the like.

In some embodiments, the decision service system 116 may also include a task execution time prediction (TETP) module 124 that is configured to predict the amount of time a DSTE node 118 may take to complete an execution of a pre-defined task. For example, as discussed above, when a request is received at the decision service system 116 from the client server 110, a pre-defined task may be assigned for execution to a DSTE node 118. In such cases, the TETP module 124 may compute the threshold time that the DSTE node 118 is expected to take to complete the execution of the pre-defined task. In some instances, the TETP module 124 may be or include a machine learning module that is capable or configured to compute threshold time or duration that a DSTE node 118 is expected to take to execute a pre-defined task to completion. For example, the TETP module 124 may include a machine learning model that is trained with DSTE node 118 execution records (e.g., such as those stored in the database 122) to calculate the threshold time of a DSTE node 118 when a pre-defined task is assigned to the DSTE node 118. That is, when a DTSE node 118 is assigned a pre-defined task, the TETP module 124 may be configured to retrieve the record related to the DSTE node 118 and stored in the database 122 to compute the threshold time that the DSTE node 118 is expected to take to complete the pre-defined task.

In some instances, the SLA time limit that is included in an SLA between the client server 110 and the decision service system 116 may be the aggregate of all the threshold times of the DSTE nodes 118 to execute pre-defined tasks assigned to each DSTE node 118 so as to generate a response to or decision regarding the request from the client server 110. That is, for example, when a request for a response or decision is received at the decision service system 116 from the client server 110 and pre-defined tasks are assigned to each of the DSTE nodes 118, the TETP module 124 may compute the threshold times for each DSTE node 118 to complete its assigned pre-defined task, and the aggregate of the threshold times may then be included in the SLA between the decision service system 116 and the client server 110 as the SLA time limit for the decision service system 116 to provide a full response or decision to the client server 110. As noted above, the TETP module 124 computes the threshold time for each DSTE node 118 based on the execution statistics for that DSTE node 118 recorded in the database 122. In some instances, the SLA time limit may not be an aggregate of the threshold times of the DSTE nodes 118 (e.g., when some of the pre-defined tasks can be performed in parallel). In such cases, the SLA time limit can be less than the aggregate execution time.

In some embodiments, as noted above, the TETP module 124 may include a machine learning model or algorithm that is trained to compute the threshold times for each DSTE node 118 to complete its assigned pre-defined task (e.g., so that the decision service system 116 may provide a full response to a request from the client server 110). In some instances, the machine learning model of the TETP module 124 may be trained with a training dataset of task execution records of DSTE nodes 118 that are stored in the database 122. For example, as discussed above, the execution records may include averages, percentiles, medians, standard deviations, etc., of the times or durations for the DSTE nodes 118 to execute their respective assigned pre-defined tasks, and the machine learning model may be trained using such records as a training dataset. In such cases, when pre-defined tasks are assigned to the DSTE nodes 118 so that a full response to a request from the client server 110 may be generated and provided by the decision service system 116, the TETP module 124 may be capable of computing the threshold time for each DSTE node 118 to complete their respective assigned pre-defined tasks (e.g., and as such be capable of computing the SLA time limit, which is the aggregate of the threshold times of each DSTE node 118, for the decision service system 116 to provide the full response to the client server 110).

In some embodiments, the machine learning model or algorithm of the TETP module 124 may include a neural network, which can be a single neural network or any number of or combination of neural networks. In some instances, the neural network can take the form of a CNN system that includes one or more neural networks. Each of these one or more neural networks may itself be a convolutional neural network. In some embodiments, the neural network may take the form of or include at least one of a Feedforward Neural Network (FNN), a Recurrent Neural Network (RNN), a Modular Neural Network (MNN), a Convolutional Neural Network (CNN), a Residual Neural Network (ResNet), an Ordinary Differential Equations Neural Networks (neural-ODE), or another type of neural network.

In some embodiments, the neural network may include a set of encoders, which can be a single encoder or multiple encoders, and a decoder. In some embodiments, the one or more encoders and/or the decoder may be implemented via a neural network, which may, in turn, be comprised of one or more neural networks. In some instances, the decoder and the one or more encoders may be implemented using a CNN. The decoder and the one or more encoders may also be implemented as a Y-Net (Y-shaped neural network system) or a U-Net (U-shaped neural network system). Further details related to neural network are provided below with reference to FIG. 7.

In some embodiments, as noted above, the TETP module 124 may be capable of monitoring a DSTE node 118 while executing a pre-defined task assigned to that DSTE node 118. As such, the TETP module 124 may be able to determine when the amount of time a DSTE node 118 takes to execute the pre-defined task deviates from that DSTE node's threshold time that is recorded in the execution records of DSTE nodes 118 stored in the database 122. Determining the deviations, in turn, may allow the TETP module 124 or the decision service system 116 to predict whether the decision service system 116 is able to provide a response to or decision regarding a request from a client server 110 within the SLA time limit specified in the SLA between the client server 110 and the decision service system 116.

In some instances, the TETP module 124 may predict that the SLA time limit may expire or time out before a response or decision is generated by the decision service system 116, for example, because of one or more of the DSTE nodes 118 taking much longer than their threshold time for completing the pre-defined task assigned to that or those DSTE nodes 118. In such cases, the decision service system 116 may determine whether it is possible to generate a partial response to the request from the client server 110. For instance, the decision service system 116 and/or the TETP module 124 may check to see whether those DSTE nodes 118 that are executing pre-defined tasks required for generating a partial response are set to complete their executions in time for the partial response to be generated by the decision service system 116 and provided to the client server 110. Upon determining that it is possible to generate a partial response, in some instances, the decision service system 116 may generate the partial response based on the execution results of the DSTE nodes 118 up to that time along with information that allows the client server 110 to retrieve the full response or decision when it is generated and available. For example, the information may include but is not limited to a unique identification of the full response (e.g., relating the full response to the partial response and/or the request from the client server 110), the address (e.g., URL address) of the decision cache 126 at which the full response may be placed by the decision service system 116 when available, a call back time stamp indicating the time the full response may become available, the validity period of the full response before its expiration, and/or the like. In some instances, once all the DSTE nodes 118 with assigned pre-defined tasks complete their executions and a full response to the request from the client server 110 is generated, the decision service system 116 may place the full response at the decision cache126 (e.g., at or before the call back time), from which the client server 110 and/or the transaction server 102 may access (e.g., via the URL link included in the information provided to the client server 110 with the partial response).

Figure 2:
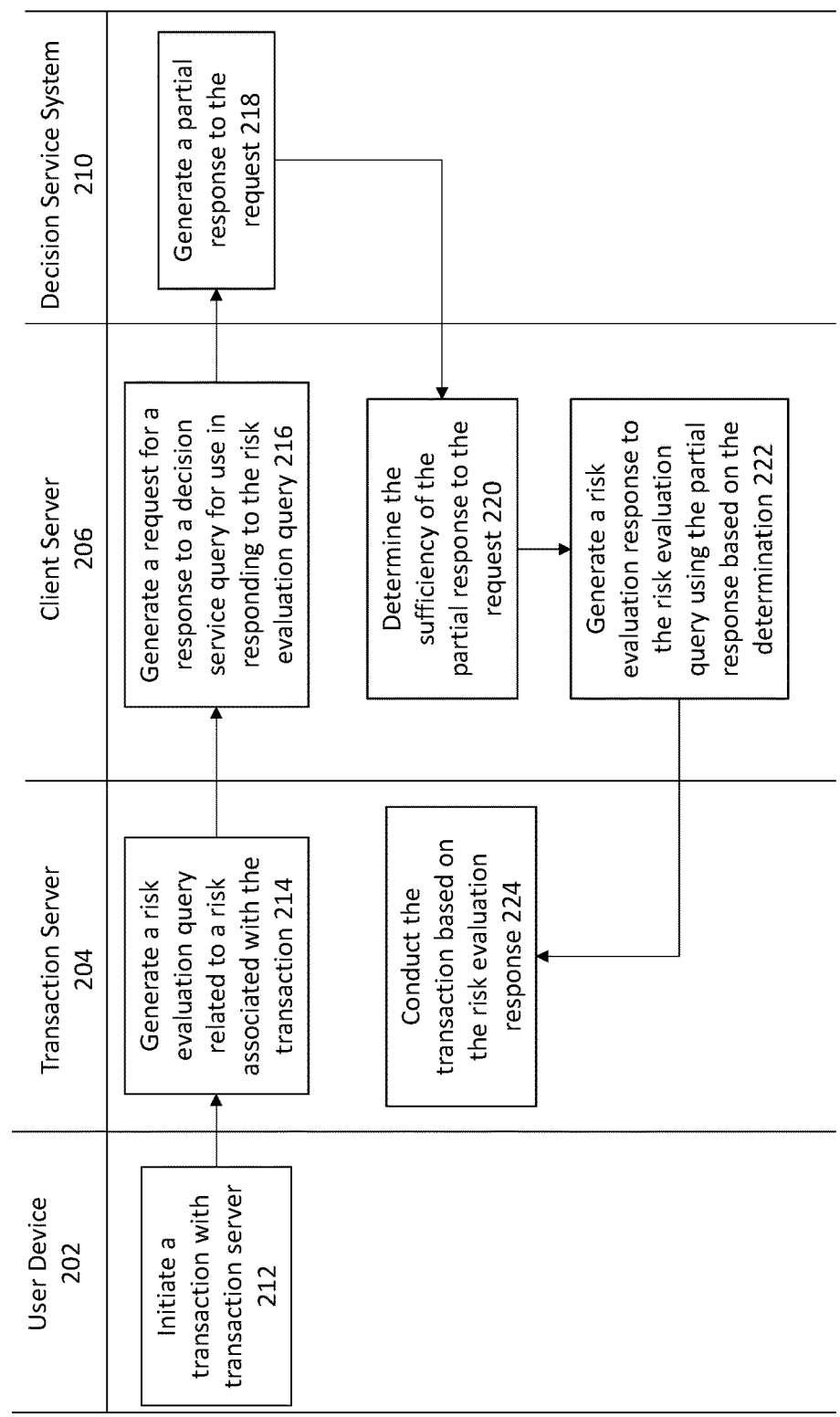
FIG. 2 illustrates an example transaction conducted based on a partial response from a decision service system, according to various embodiments of the present disclosure.

FIG. 2 illustrates an example transaction 200 conducted based on a partial response from a decision service system, according to various embodiments of the present disclosure. In some embodiments, at step 212, a customer using a user device 202 may initiate a transaction with a merchant that is using a transaction server 204 to conduct the transaction. In some instances, the user device 202 may be implemented using any appropriate hardware and software configured for wired and/or wireless communication over network 114. For example, the user device may be a personal computer (PC), a smart phone (e.g., including additional hardware such as NFC chips, BLE hardware etc.), a wearable device, a gaming device, a Virtual Reality Headset, laptop computer, tablets, and/or the like.

In some instances, the transaction may have risks associated thereto, such as financial risks, security risks, regulatory risks, etc., and the merchant may wish for the risks to be evaluated before the transaction is consummated. For instance, the merchant may have a policy stipulating that risk evaluations (e.g., of the transaction, the customer, etc.) be performed for certain types of transactions, for example, for transactions with an amount exceeding some minimum threshold and/or based on the type of the transaction (e.g., for controlled substances such as medications, etc.). In such cases, at step 214, the merchant may use the transaction server 204 to generate a risk evaluation query to have the risks associated with the transaction with the user device 202 evaluated by the decision server system 210. In some instances, upon generating the risk evaluation query, the transaction server may transmit the same to the client server 206.

In some instances, upon receiving the risk evaluation query from the transaction server 204, at step 216, the client server 206 may generate a request to the decision service system 210 for the latter to generate a response or decision that can be used to respond to the risk evaluation query from the transaction server 204. In some cases, the client server 206 may transmit the risk evaluation query directly to the decision service system as the request. In other cases, the client server 206 may generate the request based on the risk evaluation query and send the same to the decision service system 210, in which case the client server may use a response to or decision regarding the request to in turn generate a response for the risk evaluation query from the transaction server 204.

In some embodiments, the decision service system 210 may receive the request from the client server 206 and assign various pre-defined tasks to the DSTE nodes of the decision service system 210. In some instances, the pre-defined tasks assigned to the DSTE nodes may be chosen so that the results of their executions would allow the decision service system 210 to generate and provide to the client server 206 a response to or a decision regarding the request. Non-limiting examples of the pre-defined tasks include data gathering (e.g., collecting data that may be used to generate a response to the request, data validation, computations based on the data, the building of the response based on the computations, etc.). In some instances, some of the pre-defined tasks may be mandatory, i.e., their execution may be required for the generation of even a partial response to the request, while some of the other pre-defined tasks may not be mandatory, i.e., a partial response to the request may still be generated when the results of their executions are not available.

In some embodiments, the SLA between the decision service system 210 and the client server 206 may include the SLA time limit for the decision service system 210 to provide the full response to or decision regarding the request. In some instances, as discussed above, the SLA time limit may be determined based on a machine learning model of the decision service system 210 (e.g., such as the machine learning model or neural network of the TETP module 124 of FIG. 1). For example, the machine learning model may compute the threshold times for each DSTE node of the decision service system 210 to complete their assigned pre-defined tasks (e.g., based on the execution statistics for each DSTE node recorded in the database 122 that may include average time, percentiles, standard deviations, etc., for completing tasks), and determine the SLA time limit by aggregating these threshold times. In some instances, the SLA time limit may be less than the aggregate value (e.g., when some of the pre-defined tasks can be performed in parallel, in which case the SLA time limit can be less than the aggregate value).

In some embodiments, the decision service system 210 may predict that a full response to or decision regarding the request from the client server 206 cannot be generated and provided to the client server 206 before the expiration of the SLA time limit. For example, in a non-limiting implementation where five DSTE nodes are assigned to respectively execute five pre-defined tasks so that the decision service system 210 may generate a response to or decision regarding the request about the transaction risks, Table 1 shows an example method that may be used by the decision service system 210 to make such a prediction.

TABLE 1

| Nodes | Node threshold time (ms) | Execution time (ms) | Mandatory node | Deviation (ms) | Response quality |
|---|---|---|---|---|---|
| Node 1 | 50 | 35 | Yes | −15 | low |
| Node 2 | 100 | 150 | Yes | 35 | low |
| Node 3 | 200 | 250 | Yes | 85 | medium |
| Node 4 | 100 | 110 | No | 95 | high |
| Node 5 | 50 | 50 | No | 95 | complete |
| Aggregate | 500 (SLA time limit) | 595 | | 95 | |

In Table 1, the "node threshold time" indicates the threshold time for each DSTE node to complete its assigned pre-defined task. In some instances, some of the pre-defined tasks may have to be performed in series while others can be performed in parallel. In the example illustration shown in Table 1, the SLA time limit is the aggregate of the threshold execution time of all the nodes (i.e., the 500 ms). Further, as shown in the Table, nodes 1-3 are mandatory nodes, i.e., the results of their executions are required for generating at least a partial response to or decision to the request from the client server 206, while nodes 4 and 5 are non-mandatory, i.e., their execution results may not be required for generating the partial response, but may be used in generating a full response or decision.

In some embodiments, by monitoring the DSTE nodes and the executions of the pre-defined tasks assigned thereto, the decision service system 210 (e.g., via a module such as the TETP module 124 of FIG. 1) may predict the amount of time that each DSTE node may take to complete its assigned pre-defined task. The Table shows that the time taken by three mandatory DSTE nodes, nodes 1-3, to complete their executions, 35 ms+150 ms+250 ms=435 ms, is more than the total of their threshold times, 50 ms+100 ms+200 ms=350 ms, by the deviation 85 ms, which leaves the non-mandatory nodes 4 and 5 about 65 ms (i.e., 500 ms-435 ms) before the SLA time limit of 500 ms expires. In such cases, the decision service system 210 can predict that a full response (i.e., a response generated after all the DSTE nodes completed executing their assigned tasks) may not be completed before the expiration of the SLA time limit, and the decision service system 210 may then generate a partial response using the execution results of the mandatory nodes (e.g., DSTE nodes 1-3), and optionally the execution results of some non-mandatory nodes provided the partial response can be generated and provided to the client server 206 before the SLA time limit expires.

In some embodiments, along with the partial response, the decision service system 210 may also generate information that may be provided to the client server 206 to allow the same, or the transaction server 204, to access the full response to or decision regarding the request when it becomes available. For example, the information may include a unique identification of the full response (e.g., relating the full response to the partial response and/or the request), the address (e.g., a URL address) of the decision cache at which the full response may be placed by the decision service system 210 when available, a call back time stamp indicating the time the full response may become available (e.g., 595 ms after the request is submitted to the decision service system 210, versus the 500 ms SLA time limit), the validity period of the full response before its expiration, etc. In some instances, the decision service system 210 may then provide the partial response and the information to the client server 206 before the expiration of the SLA time limit. Further, the decision service system 210 may also place the full response at the decision cache (e.g., similar to decision cache 126).

In some embodiments, at step 220, the client server 206 may determine the sufficiency of the partial response or decision received from the decision service system as a response to the request from the client server 206 to the decision service system 210. That is, the client server 206 may determine whether the received partial response is at least sufficient for the client server 206 to use in generating a risk evaluation response to the risk evaluation query received from the transaction server 204 at the client server 206. In some instances, the client server 206 may compute a partial response evaluation factor measuring the sufficiency of the partial response for use in generating the risk evaluation response to the risk evaluation query. For example, the client server 206 may compute the partial response sufficiency factor using the following expression:

$$F_x\{r\}=\{Q\{r\},C\{p\},T\{cb\},T\{v\},ctx\},$$

where $F_x\{r\}$ is the partial response evaluation factor for partial response r, $Q\{r\}$ is the quality of the partial response, $C\{p\}$ is the critical response parameters, $T\{cb\}$ is the call back time stamp, $T\{v\}$ is the validity time stamp, and ctx is the context for the risk evaluation query from the transaction server 204.

In some embodiments, at step 222, the client server 206 may use the aforementioned partial response evaluation factor (i.e., the partial response sufficiency factor $F_x\{r\}$) to determine whether to use the partial response to generate a risk evaluation response to the risk evaluation query from the transaction server 204. In some instances, a higher value for $Q\{r\}$, indicating a high quality of partial response, may be related to a higher partial response evaluation factor $F_x\{r\}$, indicating that the client server 206 can use the partial response to generate a risk evaluation response to the transaction server's risk evaluation query (e.g., and as such may not have to wait till the full response is available to generate the risk evaluation response). In some instances, the opposite may be true too, i.e., a lower value for $Q\{r\}$, indicating a low quality of partial response, may be related to a lower partial response evaluation factor $F_x\{r\}$, indicating that the client server 206 may not use the partial response, and instead wait till the full response is available at the decision cache, to generate a risk evaluation response to the transaction server's risk evaluation query. In some cases, the client server 206 may not use the partial response if $Q\{r\}$ is below a threshold value, and instead may wait to access the full response for generating the risk evaluation response.

In some instances, the client server 206 may not use the partial response to generate the risk evaluation response unless the partial response includes critical response parameters $C\{p\}$, i.e., parameters that are needed or required, for example, to properly evaluate the risks associated with the transaction between the transaction server 204 and the user device 202. In some instances, a higher value for $T\{cb\}$, indicating that the full response may not be available for a long duration and that there may be a long wait period, may be related to a higher partial response evaluation factor $F_x\{r\}$, indicating that the client server 206 may want to use the partial response to generate a risk evaluation response to the transaction server's risk evaluation query, instead of waiting the long duration until the full response is available to generate the risk evaluation response.

In some instances, the validity time stamp $T\{v\}$ may be calculated using at least in part the wait time period, i.e., the time period until the call back time stamp $T\{cb\}$ when the full response is available and the current context ctx of the merchant (i.e., the entity making the request for the risk evaluation). For instance, ctx may indicate that a response to the transaction server's risk evaluation query is urgently or quickly needed (e.g., because otherwise the transaction with the customer, and as such financial gain, may be lost unless the transaction risks are evaluated quickly and a determination is done whether to allow the transaction to proceed). In some instances, an expired validity time stamp $T\{v\}$ may result in a partial response evaluation factor $F_x\{r\}$ that indicates that the partial response cannot be used by the client server 206.

In some instances, as shown by the above expression, the partial response evaluation factor $F_x\{r\}$ may depend on the current context ctx of the entity making the request for the risk evaluation (i.e., the merchant and/or the transaction server 204). For example, if the ctx indicates that the transaction is for a very high value, then the value of $F_x\{r\}$ may indicate that the client server 206 should wait for the full response to be available before generating the risk evaluation response to the transaction server's risk evaluation query. With reference to the other example, if ctx indicates that a response to the transaction server's risk evaluation query is urgently or quickly needed, then $F_x\{r\}$ may indicate that the client server 206 should use the partial response to generate the risk evaluation response, instead of waiting for the full response.

Figure 3:
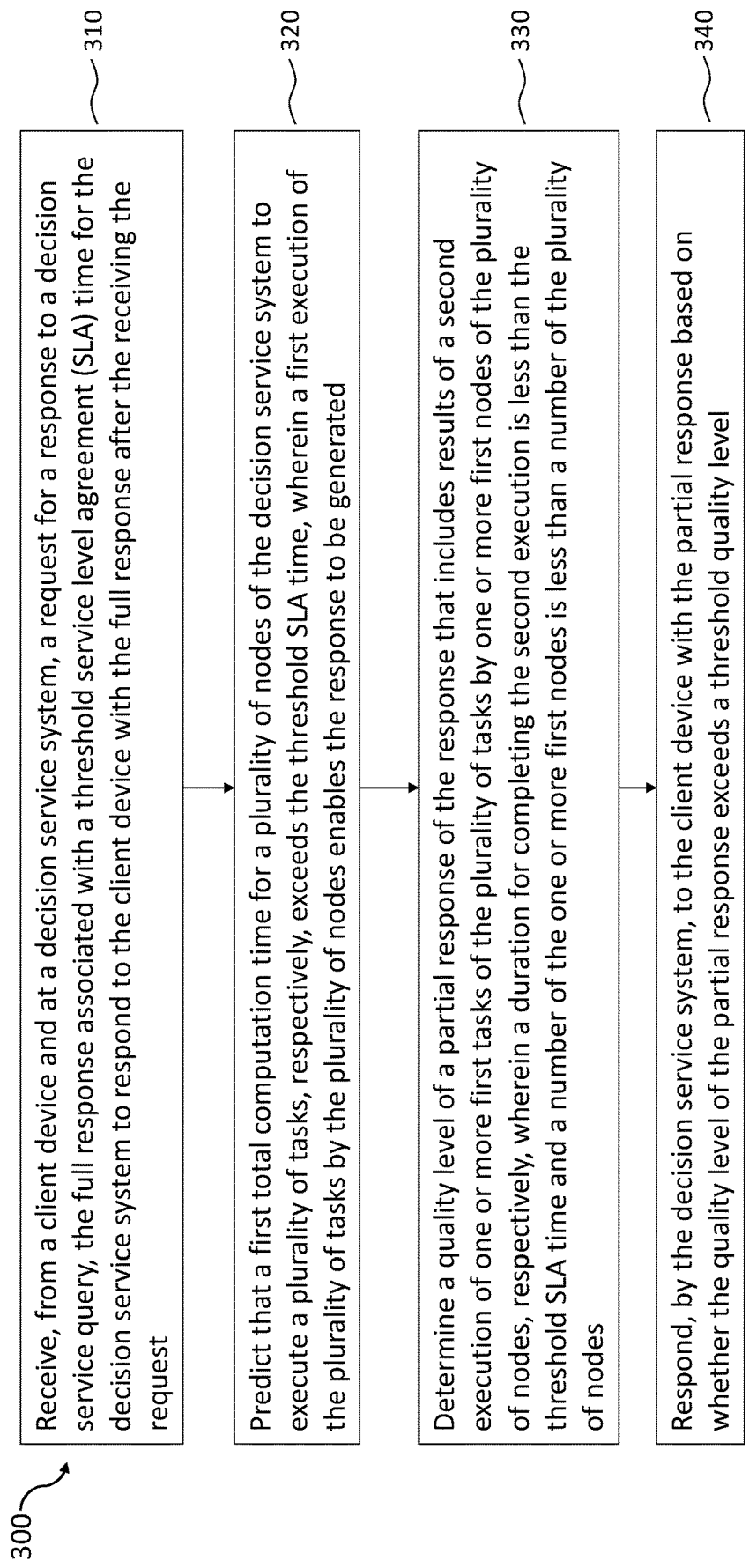
FIG. 3 is a flowchart illustrating a method of generating a partial response to a decision service query, according to various aspects of the present disclosure.

FIG. 3 is a flowchart illustrating a method 300 of generating a partial response to a decision service query, according to various aspects of the present disclosure. The various steps of the method 300, which are described in greater detail above, may be performed by one or more electronic processors, for example by the processors of the transaction server 102, client server 110, decision service system 116, user device 202, and/or decision cache storage 126. Further, it is understood that additional method steps may be performed before, during, or after the steps 310-340 discussed below. In addition, in some embodiments, one or more of the steps 310-340 may also be omitted.

The method 300 includes a step 310 to receive, from a client device and at a decision service system, a request for a response to a decision service query, the full response associated with a threshold service level agreement (SLA) time for the decision service system to respond to the client device with the full response after the receiving the request.

The method 300 includes a step 320 to predict that a first total computation time for a plurality of nodes of the decision service system to execute a plurality of tasks, respectively, exceeds the threshold SLA time (i.e., the SLA time limit), wherein a first execution of the plurality of tasks by the plurality of nodes enables the response to be generated. In some instances, each of the plurality of tasks is a pre-defined task assigned to one of the plurality of nodes, wherein the predicting comprises dynamically computing, using a machine learning model, a threshold time for the one of the plurality of nodes to execute the pre-defined task. In some instances, the machine learning model includes a neural network. In some instances, the plurality of tasks includes a data gathering task collecting data required for generating the response, a data validation task validating the gathered data, a computation task performing computations using the validated data, and a response building task generating the response based on the computations, and wherein the plurality of tasks are respectively assigned to the plurality of nodes. In some instances, the predicting comprises predicting a second total computation time for one or more second nodes of the one or more first nodes to execute one or more second tasks of the one or more first tasks, respectively, and wherein a third execution of one or more second tasks by the one or more second nodes generates the partial response.

The method 300 includes a step 330 to determine a quality level of a partial response of the response that includes results of a second execution of one or more first tasks of the plurality of tasks by one or more first nodes of the plurality of nodes, respectively, wherein a duration for completing the second execution is less than the threshold SLA time and a number of the one or more first nodes is less than a number of the plurality of nodes. In some instances, the partial response includes a callback time stamp indicating a time for the response to be available from the decision service system. In some instances, the partial response includes a link configured for use by the client device to access the response at or after the time indicated by the callback time stamp.

The method 300 includes a step 340 to respond, by the decision service system, to the client device with the partial response based on whether the quality level of the partial response exceeds a threshold quality level.

Figure 4:
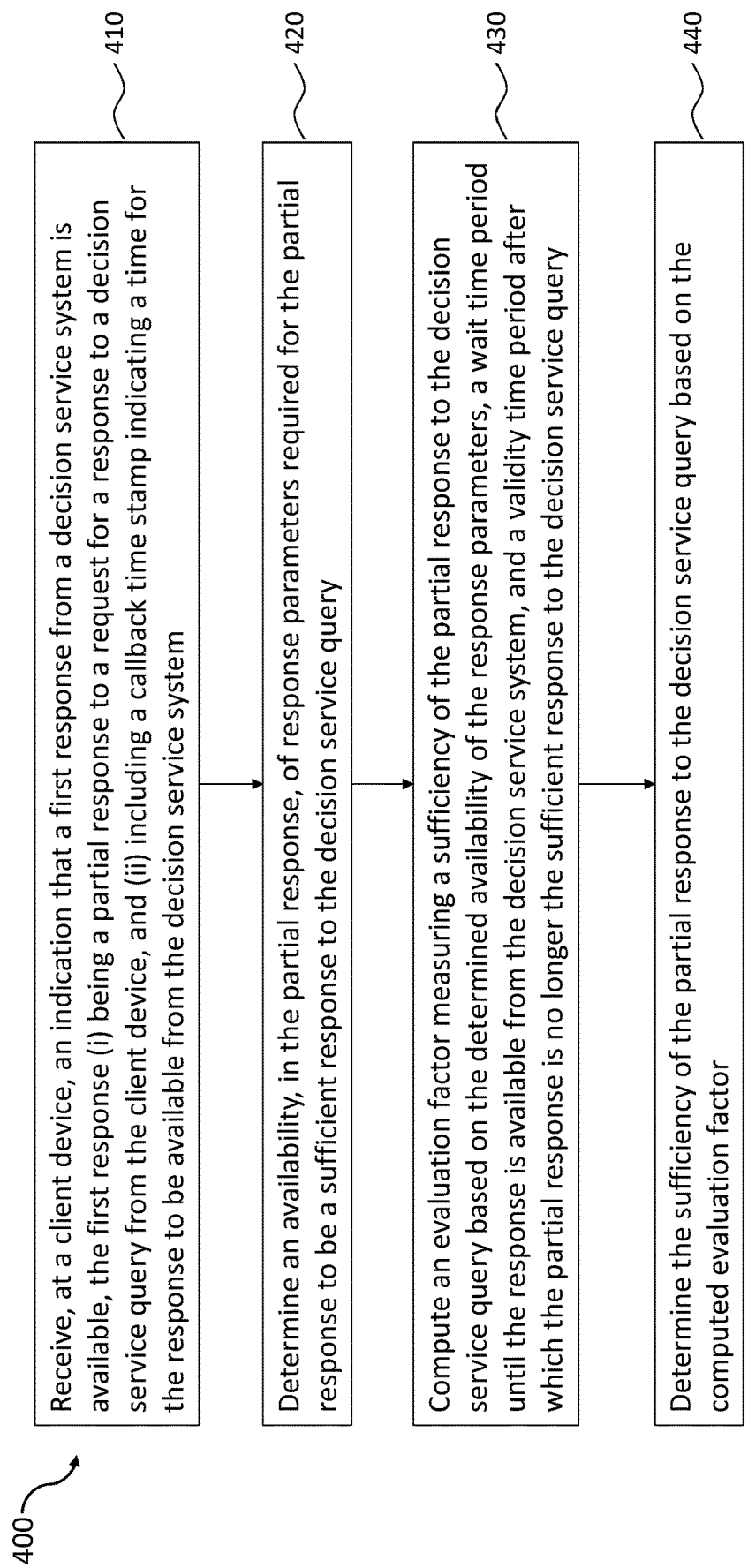
FIG. 4 is a flowchart illustrating a method of determining the sufficiency of a partial response to a decision service query, according to various aspects of the present disclosure.

FIG. 4 is a flowchart illustrating a method 400 of determining the sufficiency of a partial response to a decision service query, according to various aspects of the present disclosure. The various steps of the method 400, which are described in greater detail above, may be performed by one or more electronic processors, for example by the processors of the transaction server 102, client server 110, decision service system 116, user device 202, and/or decision cache storage 126. Further, it is understood that additional method steps may be performed before, during, or after the steps 410-440 discussed below. In addition, in some embodiments, one or more of the steps 410-440 may also be omitted.

The method 400 includes a step 410 to receive, at a client device, an indication that a first response from a decision service system is available, the first response (i) being a partial response to a request for a response to a decision service query from the client device, and (ii) including a callback time stamp indicating a time for the response to be available from the decision service system.

The method 400 includes a step 420 to determine an availability, in the partial response, of response parameters required for the partial response to be a sufficient response to the decision service query.

The method 400 includes a step 430 to compute an evaluation factor measuring a sufficiency of the partial response to the decision service query based on the determined availability of the response parameters, a wait time period until the response is available from the decision service system, and a validity time period after which the partial response is no longer the sufficient response to the decision service query.

The method 400 includes a step 440 to determine the sufficiency of the partial response to the decision service query based on the computed evaluation factor. In some instances, the determining the sufficiency of the partial response includes accessing the response via a link configured to be included in the partial response when the computed evaluation factor is less than a threshold response sufficiency score. In some instances, the determining the sufficiency of the partial response includes using the partial response as the sufficient response to the decision service query when the computed evaluation factor exceeds a threshold response sufficiency score.

In some instances, the client device generates the decision service query in response to receiving, from a transaction server, a risk evaluation query related to a transactional risk associated with a transaction occurring at the transaction server. In some instances, the computing is based on a service level agreement (SLA) time for the client device to respond to the transaction server with a second response to the risk evaluation query after the receiving the risk evaluation query. In some instances, the computing is based on an amount of the transaction occurring at the transaction server.

Figure 5:
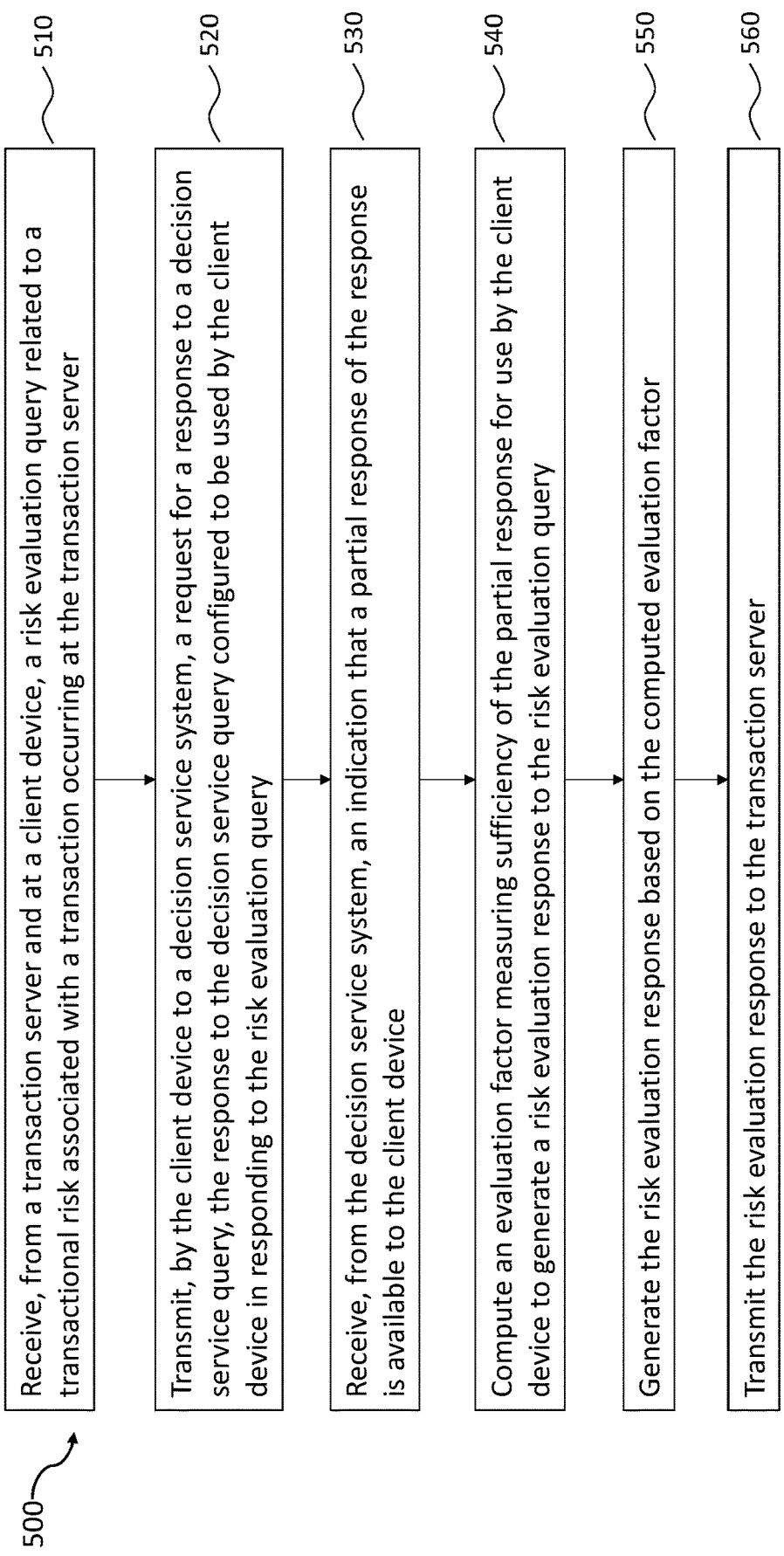
FIG. 5 is a flowchart illustrating a method of generating, based on a partial response from a decision service, a risk evaluation response to a transactional risk, according to various aspects of the present disclosure.

FIG. 5 is a flowchart illustrating a method 500 of generating, based on a partial response from a decision service, a risk evaluation response to a transactional risk, according to various aspects of the present disclosure. The various steps of the method 500, which are described in greater detail above, may be performed by one or more electronic processors, for example by the processors of the transaction server 102, client server 110, decision service system 116, user device 202, and/or decision cache storage 126. Further, it is understood that additional method steps may be performed before, during, or after the steps 510-560 discussed below. In addition, in some embodiments, one or more of the steps 510-560 may also be omitted.

The method 500 includes a step 510 to receive, from a transaction server and at a client device, a risk evaluation query related to a transactional risk associated with a transaction occurring at the transaction server.

The method 500 includes a step 520 to transmit, by the client device to a decision service system, a request for a response to a decision service query, the response to the decision service query configured to be used by the client device in responding to the risk evaluation query.

The method 500 includes a step 530 to receive, from the decision service system, an indication that a partial response of the response is available to the client device. In some instances, the partial response includes a callback time stamp indicating a time for the full response to be available from the decision service system. Some embodiments of method 500 further include using the partial response as a sufficient response to the decision service query if an SLA time for the client device to respond to the transaction server with the risk evaluation response expires before the time indicated in the callback time stamp arrives.

The method 500 includes a step 540 to compute an evaluation factor measuring sufficiency of the partial response for use by the client device to generate a risk evaluation response to the risk evaluation query. In some instances, the risk evaluation response is generated based further on the partial response when the computed evaluation factor exceeds a threshold response sufficiency score. In some instances, the computation of the evaluation factor is based on an availability of critical response parameters in the partial response, a wait time period until the response is available from the decision service system, and a validity time period after which the partial response is no longer a sufficient response to the decision service query. In some instances, the computation of the evaluation factor is based on an amount of the transaction occurring at the transaction server.

The method 500 includes a step 550 to generate the risk evaluation response based on the computed evaluation factor.

The method 500 includes a step 560 to transmit the risk evaluation response to the transaction server.

Some embodiments of method 500 further include accessing the response via a link configured to be included in the partial response when the computed evaluation factor is less than a threshold response sufficiency score.

Figure 6:
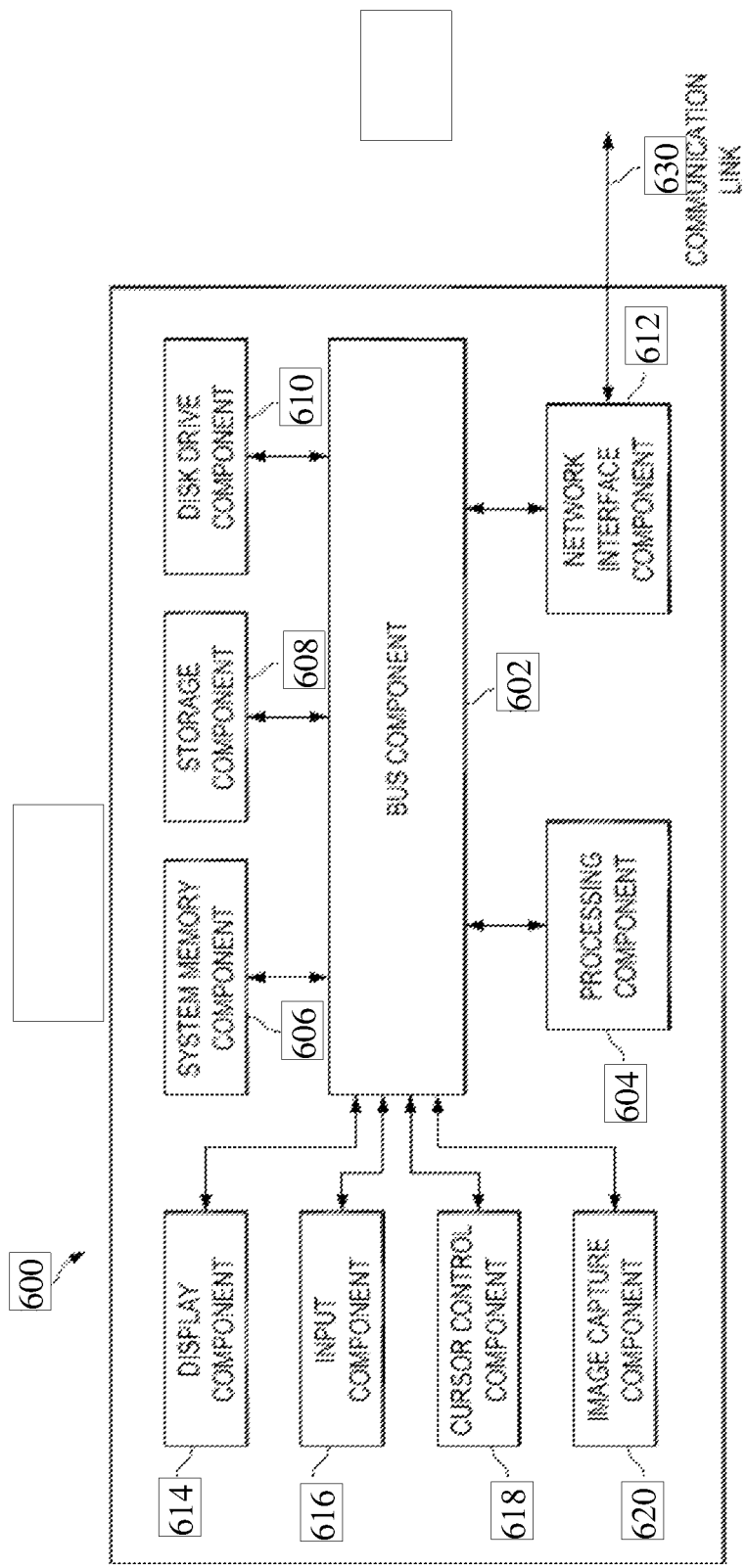
FIG. 6 is an example computer system according to various aspects of the present disclosure.

FIG. 6 is a block diagram of a computer system 600 suitable for implementing various methods and devices described herein, for example, the transaction server 102, client server 110, decision service system 116, user device 202, decision cache storage 126, and/or the like. In various implementations, the devices capable of performing the steps may comprise a network communications device (e.g., mobile cellular phone, laptop, personal computer, tablet, etc.), a network computing device (e.g., a network server, a computer processor, a developer workstation, an electronic communications interface, etc.), or another suitable device. Accordingly, it should be appreciated that the devices capable of implementing the aforementioned servers, systems, and modules, and the various method steps of the methods 200, 300, 400, and 500 discussed above may be implemented as the computer system 600 in a manner as follows.

In accordance with various embodiments of the present disclosure, the computer system 600, such as a network server, a workstation, a computing device, a communications device, etc., includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure. In some embodiments, the various components of the transaction server 102, client server 110, decision service system 116, user device 202, decision cache storage 126, etc., may be in the form of software instructions that can be executed by the processor 604 to automatically perform context-appropriate tasks on behalf of a user.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the transaction server 102, client server 110, decision service system 116, user device 202, decision cache storage 126, etc., discussed above.

In various embodiments of the present disclosure, execution of instruction sequences to practice the present disclosure may be performed by computer system 600. In various other embodiments of the present disclosure, a plurality of computer systems 600 coupled by communication link 622 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 622 and communication interface 612. Received program code may be executed by computer processor 604 as received and/or stored in disk drive component 610 or some other non-volatile storage component for execution. The communication link 622 and/or the communication interface 612 may be used to conduct electronic communications between the transaction server 102, client server 110, decision service system 116, user device 202, decision cache storage 126, etc., for example.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the transaction server 102, client server 110, decision service system 116, user device 202, decision cache storage 126, etc., may be implemented as such software code.

Figure 7:
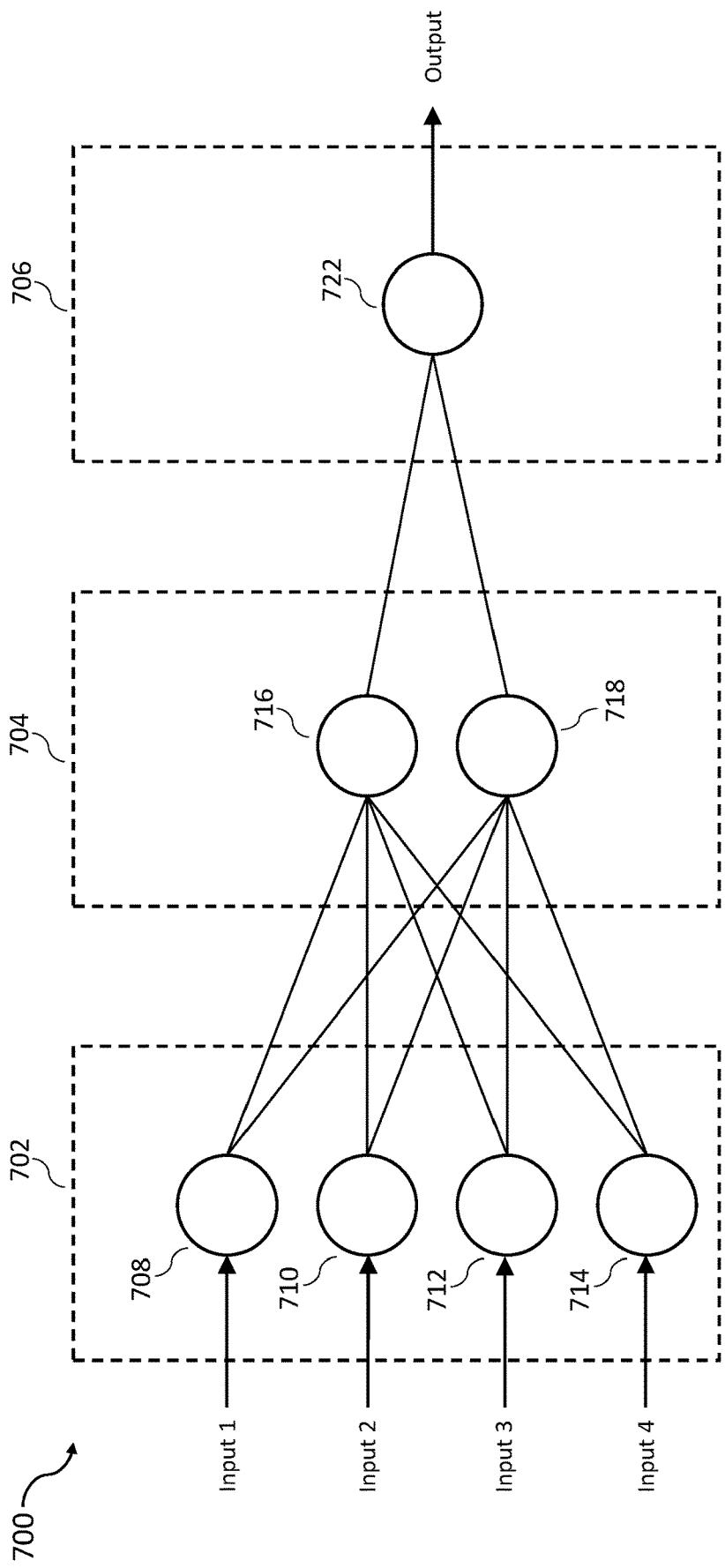
FIG. 7 illustrates an example artificial neural network according to various embodiments of the present disclosure Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

FIG. 7 illustrates an example neural network 700 that can be used to implement the machine learning model of the TETP module 124, according to various embodiments of the present disclosure. As shown, the artificial neural network 700 includes three layers—an input layer 702, a hidden layer 704, and an output layer 706. Each of the layers 702, 704, and 706 may include one or more nodes. For example, the input layer 702 includes nodes 708-714, the hidden layer 704 includes nodes 716-718, and the output layer 706 includes a node 722. In this example, each node in a layer is connected to every node in an adjacent layer. For example, the node 708 in the input layer 702 is connected to both of the nodes 716, 718 in the hidden layer 704. Similarly, the node 716 in the hidden layer is connected to all of the nodes 708-714 in the input layer 702 and the node 722 in the output layer 706. Although only one hidden layer is shown for the artificial neural network 700, it has been contemplated that the artificial neural network 500 used to implement the machine learning model of the TETP module 124 may include as many hidden layers as necessary or desired.

In this example, the artificial neural network 700 receives a set of input values and produces an output value. Each node in the input layer 702 may correspond to a distinct input value. For example, when the artificial neural network 700 is used to implement the machine learning model of the TETP module 124, each node in the input layer 702 may correspond to a distinct attribute of an execution record stored in the database 122.

In some embodiments, each of the nodes 716-718 in the hidden layer 704 generates a representation, which may include a mathematical computation (or algorithm) that produces a value based on the input values received from the nodes 708-714. The mathematical computation may include assigning different weights to each of the data values received from the nodes 708-714. The nodes 716 and 718 may include different algorithms and/or different weights assigned to the data variables from the nodes 708-714 such that each of the nodes 716-718 may produce a different value based on the same input values received from the nodes 708-714. In some embodiments, the weights that are initially assigned to the features (or input values) for each of the nodes 716-718 may be randomly generated (e.g., using a computer randomizer). The values generated by the nodes 716 and 718 may be used by the node 722 in the output layer 706 to produce an output value for the artificial neural network 700. When the artificial neural network 700 is used to implement the machine learning model of the TETP module 124, the output value produced by the artificial neural network 700 may include the threshold times of the DSTE nodes 118 to execute pre-defined tasks assigned to each DSTE node 118 (e.g., and as such the SLA time limit, which is the aggregate of the threshold times, for the decision service system 116 to provide a full response or decision to the client server 110).

The artificial neural network 700 may be trained by using training data. For example, the training data herein may be the task execution records of DSTE nodes 118 that are stored in the database 122. By providing training data to the artificial neural network 700, the nodes 716-718 in the hidden layer 704 may be trained (adjusted) such that an optimal output is produced in the output layer 706 based on the training data. By continuously providing different sets of training data, and penalizing the artificial neural network 700 when the output of the artificial neural network 700 is incorrect (e.g., when computing an incorrect threshold time, for example, compared to the other statistical metrics such as the average, median, etc., of the time it takes a DSTE node 118 to take to complete a pre-defined task), the artificial neural network 700 (and specifically, the representations of the nodes in the hidden layer 704) may be trained (adjusted) to improve its performance. Adjusting the artificial neural network 700 may include adjusting the weights associated with each node in the hidden layer 704.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Another example is a machine learning engine that employs a decision tree learning model to conduct the machine learning process. In some instances, decision tree learning models may include classification tree models, as well as regression tree models. In some embodiments, the machine learning engine employs a Gradient Boosting Machine (GBM) model (e.g., XGBoost) as a regression tree model. Other machine learning techniques may be used to implement the machine learning engine, for example via Random Forest or Deep Neural Networks. Other types of machine learning algorithms are not discussed in detail herein for reasons of simplicity and it is understood that the present disclosure is not limited to a particular type of machine learning.

RECITATIONS OF VARIOUS EMBODIMENTS OF THE PRESENT DISCLOSURE

Embodiment 1: A method, comprising: receiving, from a client device and at a decision service system, a request for a response to a decision service query, the full response associated with a threshold service level agreement (SLA) time for the decision service system to respond to the client device with the full response after the receiving the request; predicting that a first total computation time for a plurality of nodes of the decision service system to execute a plurality of tasks, respectively, exceeds the threshold SLA time, wherein a first execution of the plurality of tasks by the plurality of nodes enables the response to be generated; determining a quality level of a partial response of the response that includes results of a second execution of one or more first tasks of the plurality of tasks by one or more first nodes of the plurality of nodes, respectively, wherein a duration for completing the second execution is less than the threshold SLA time and a number of the one or more first nodes is less than a number of the plurality of nodes; and responding, by the decision service system, to the client device with the partial response based on whether the quality level of the partial response exceeds a threshold quality level.

Embodiment 2: The method of embodiment 1, wherein each of the plurality of tasks is a pre-defined task assigned to one of the plurality of nodes, wherein the predicting comprises dynamically computing, using a machine learning model, a threshold time for the one of the plurality of nodes to execute the pre-defined task.

Embodiment 3: The method of embodiment 2, wherein the machine learning model includes neural network.

Embodiment 4: The method of any of embodiments 1-3, wherein the plurality of tasks includes a data gathering task collecting data required for generating the response, a data validation task validating the gathered data, a computation task performing computations using the validated data, and a response building task generating the response based on the computations, and wherein the plurality of tasks are respectively assigned to the plurality of nodes.

Embodiment 5: The method of any of embodiments 1-4, wherein the partial response includes a callback time stamp indicating a time for the response to be available from the decision service system.

Embodiment 6: The method of embodiment 5, wherein the partial response includes a link configured for use by the client device to access the response at or after the time indicated by the callback time stamp.

Embodiment 7: The method of any of embodiments 1-6, wherein the predicting comprises predicting a second total computation time for one or more second nodes of the one or more first nodes to execute one or more second tasks of the one or more first tasks, respectively, and wherein a third execution of one or more second tasks by the one or more second nodes generates the partial response.

Embodiment 8: A method, comprising: receiving, at a client device, an indication that a first response from a decision service system is available, the first response (i) being a partial response to a request for a response to a decision service query from the client device, and (ii) including a callback time stamp indicating a time for the response to be available from the decision service system; determining an availability, in the partial response, of response parameters required for the partial response to be a sufficient response to the decision service query; computing an evaluation factor measuring a sufficiency of the partial response to the decision service query based on the determined availability of the response parameters, a wait time period until the response is available from the decision service system, and a validity time period after which the partial response is no longer the sufficient response to the decision service query; and determining the sufficiency of the partial response to the decision service query based on the computed evaluation factor.

Embodiment 9: The method of embodiment 8, wherein the determining the sufficiency of the partial response includes accessing the response via a link configured to be included in the partial response when the computed evaluation factor is less than a threshold response sufficiency score.

Embodiment 10: The method of embodiment 8 or 9, wherein the determining the sufficiency of the partial response includes using the partial response as the sufficient response to the decision service query when the computed evaluation factor exceeds a threshold response sufficiency score.

Embodiment 11: The method of any of embodiments 8-10, wherein the client device generates the decision service query in response to receiving, from a transaction server, a risk evaluation query related to a transactional risk associated with a transaction occurring at the transaction server.

Embodiment 12: The method of embodiment 11, wherein the computing is based on a service level agreement (SLA) time for the client device to respond to the transaction server with a second response to the risk evaluation query after the receiving the risk evaluation query.

Embodiment 13: The method of embodiment 11, wherein the computing is based on an amount of the transaction occurring at the transaction server.

Embodiment 14: A method, comprising: receiving, from a transaction server and at a client device, a risk evaluation query related to a transactional risk associated with a transaction occurring at the transaction server; transmitting, by the client device to a decision service system, a request for a response to a decision service query, the response to the decision service query configured to be used by the client device in responding to the risk evaluation query; receiving, from the decision service system, an indication that a partial response of the response is available to the client device; computing an evaluation factor measuring sufficiency of the partial response for use by the client device to generate a risk evaluation response to the risk evaluation query; generating the risk evaluation response based on the computed evaluation factor; and transmitting the risk evaluation response to the transaction server.

Embodiment 15: The method of embodiment 14, wherein the risk evaluation response is generated based further on the partial response when the computed evaluation factor exceeds a threshold response sufficiency score.

Embodiment 16: The method of embodiment 14 or 15, further comprising accessing the response via a link configured to be included in the partial response when the computed evaluation factor is less than a threshold response sufficiency score.

Embodiment 17: The method of any of embodiments 14-16, wherein the computing is based on an availability of critical response parameters in the partial response, a wait time period until the response is available from the decision service system, and a validity time period after which the partial response is no longer a sufficient response to the decision service query.

Embodiment 18: The method of any of embodiments 14-17, wherein the partial response includes a callback time stamp indicating a time for the full response to be available from the decision service system.

Embodiment 19: The method of embodiment 18, further comprising using the partial response as a sufficient response to the decision service query if a service level agreement (SLA) time for the client device to respond to the transaction server with the risk evaluation response expires before the time indicated in the callback time stamp arrives.

Embodiment 20: The method of any of embodiments 14-19, wherein the computing is based on an amount of the transaction occurring at the transaction server.

Embodiment 21: A system, comprising: a memory; a processor coupled to the memory and configured to, when executing instructions stored on the memory, to cause the system to perform the methods of embodiments 1-20.

Embodiment 22: A non-transitory computer-readable medium (CRM) having program code recorded thereon, the program code comprises code for causing a system to perform the methods of embodiments 1-20.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
receiving, from a client device and at a decision service system, a request for a response to a decision service query, the response associated with a threshold service level agreement (SLA) time for the decision service system to respond to the client device with a full response of the response after the receiving the request;
predicting that a first total computation time for a plurality of nodes of the decision service system to execute a plurality of tasks, respectively, exceeds the threshold SLA time, wherein a first execution of the plurality of tasks by the plurality of nodes enables the response to be generated;
determining a quality level of a partial response of the response that includes results of a second execution of one or more first tasks of the plurality of tasks by one or more first nodes of the plurality of nodes, respectively, wherein a duration for completing the second execution is less than the threshold SLA time and a number of the one or more first nodes is less than a number of the plurality of nodes; and
responding, by the decision service system, to the client device with the partial response based on whether the quality level of the partial response exceeds a threshold quality level.

2. The method of claim 1, wherein each of the plurality of tasks is a pre-defined task assigned to one of the plurality of nodes, wherein the predicting comprises dynamically computing, using a machine learning model, a threshold time for the one of the plurality of nodes to execute the pre-defined task.

3. The method of claim 2, wherein the machine learning model includes neural network machine learning model.

4. The method of claim 1, wherein the plurality of tasks includes a data gathering task collecting data required for generating the response, a data validation task validating the gathered data, a computation task performing computations using the validated data, and a response building task generating the response based on the computations, and wherein the plurality of tasks are respectively assigned to the plurality of nodes.

5. The method of claim 1, wherein the partial response includes a callback time stamp indicating a time for the response to be available from the decision service system.

6. The method of claim 5, wherein the partial response includes a link configured for use by the client device to access the response at or after the time indicated by the callback time stamp.

7. The method of claim 1, wherein the predicting comprises predicting a second total computation time for one or more second nodes of the one or more first nodes to execute one or more second tasks of the one or more first tasks, respectively, and wherein a third execution of one or more second tasks by the one or more second nodes generates the partial response.

8. A system comprising:
a processor; and
a non-transitory computer-readable medium having stored thereon instructions that are executable by the processor to cause the system to perform operations comprising:
receiving, from a client device, a request for a response to a decision service query, the response associated with a threshold service level agreement (SLA) time for responding to the client device with a full response of the response after the receiving the request;
predicting that a first total computation time for a plurality of nodes to execute a plurality of tasks, respectively, exceeds the threshold SLA time, wherein a first execution of the plurality of tasks by the plurality of nodes enables the response to be generated;
determining a quality level of a partial response of the response that includes results of a the plurality of nodes, respectively, wherein a duration for completing the second execution is less than the threshold SLA time and a number of the one or more first nodes is less than a number of the plurality of nodes; and responding to the client device with the partial response based on whether the quality level of the partial response exceeds a threshold quality level.

9. The system of claim 8, wherein each of the plurality of tasks is a pre-defined task assigned to one of the plurality of nodes, wherein the predicting comprises dynamically computing, using a machine learning model, a threshold time for the one of the plurality of nodes to execute the pre-defined task.

10. The system of claim 9, wherein the machine learning model includes a neural network machine learning model.

11. The system of claim 8, wherein the plurality of tasks includes a data gathering task collecting data required for generating the response, a data validation task validating the gathered data, a computation task performing computations using the validated data, and a response building task generating the response based on the computations, and wherein the plurality of tasks are respectively assigned to the plurality of nodes.

12. The system of claim 8, wherein the partial response includes a callback time stamp indicating a time for the response to be available.

13. The system of claim 12, wherein the partial response includes a link configured for use by the client device to access the response at or after the time indicated by the callback time stamp.

14. The system of claim 8, wherein the predicting comprises predicting a second total computation time for one or more second nodes of the one or more first nodes to execute one or more second tasks of the one or more first tasks, respectively, and wherein a third execution of the one or more second tasks by the one or more second nodes generates the partial response.

15. A non-transitory machine-readable medium having stored thereon machine-readable instructions executable to cause a machine to perform operations comprising:
receiving, from a client device and at a decision service system, a request for a response to a decision service query, the response associated with a threshold service level agreement (SLA) time for the decision service system to respond to the client device with a full response of the response after the receiving the request;
predicting that a first total computation time for a plurality of nodes of the decision service system to execute a plurality of tasks, respectively, exceeds the threshold SLA time, wherein a first execution of the plurality of tasks by the plurality of nodes enables the response to be generated;
determining a quality level of a partial response of the response that includes results of a second execution of one or more first tasks of the plurality of tasks by one or more first nodes of the plurality of nodes, respectively, wherein a duration for completing the second execution is less than the threshold SLA time and a number of the one or more first nodes is less than a number of the plurality of nodes; and
responding, by the decision service system, to the client device with the partial response based on whether the quality level of the partial response exceeds a threshold quality level.

16. The non-transitory machine-readable medium of claim 15, wherein each of the plurality of tasks is a pre-defined task assigned to one of the plurality of nodes, wherein the predicting comprises dynamically computing, using a machine learning model, a threshold time for the one of the plurality of nodes to execute the pre-defined task.

17. The non-transitory machine-readable medium of claim 16, wherein the machine learning model includes a neural network machine learning model.

18. The non-transitory machine-readable medium of claim 15, the plurality of tasks includes a data gathering task collecting data required for generating the response, a data validation task validating the gathered data, a computation task performing computations using the validated data, and a response building task generating the response based on the computations, and wherein the plurality of tasks are respectively assigned to the plurality of nodes.

19. The non-transitory machine-readable medium of claim 15, wherein the partial response includes a callback time stamp indicating a time for the response to be available from the decision service system, and wherein the partial response includes a link configured for use by the client device to access the response at or after the time indicated by the callback time stamp.

20. The non-transitory machine-readable medium of claim 15, wherein the predicting comprises predicting a second total computation time for one or more second nodes of the one or more first nodes to execute one or more second tasks of the one or more first tasks, respectively, and wherein a third execution of the one or more second tasks by the one or more second nodes generates the partial response.

\* \* \* \* \*

UNITED STATES PATENT AND TRADEMARK OFFICE
CERTIFICATE OF CORRECTION

| | |
|---|---|
| PATENT NO. | : 11,983,721 B2 |
| APPLICATION NO. | : 17/514347 |
| DATED | : May 14, 2024 |
| INVENTOR(S) | : Prabin Patodia and Sumit Kumar |

It is certified that error appears in the above-identified patent and that said Letters Patent is hereby corrected as shown below:

In the Claims

Claim 8, Column 22, Lines 63-64, change "includes results of a the plurality of nodes, respectively," to --includes results of a second execution of one or more first tasks of the plurality of tasks by one or more first nodes of the plurality of nodes, respectively,--.

Signed and Sealed this
Seventh Day of January, 2025

Derrick Brent
*Acting Director of the United States Patent and Trademark Office*